(12) United States Patent
Clemens et al.

(10) Patent No.: US 6,849,338 B2
(45) Date of Patent: Feb. 1, 2005

(54) COATING SYSTEM FOR A POROUS SUBSTRATE USING AN ASPHALT-CONTAINING THERMOSETTING BASECOAT COMPOSITION AND A THERMOPLASTIC TOP COAT COMPOSITION

(75) Inventors: Paul L Clemens, Brush Prairie, WA (US); Leslie G Clemens, Brush Prairie, WA (US)

(73) Assignee: Pacific Northwest Coatings, Portland, OR (US)

( * ) Notice: Subject to any disclaimer, the term of this patent is extended or adjusted under 35 U.S.C. 154(b) by 0 days.

(21) Appl. No.: 10/337,820

(22) Filed: Jan. 8, 2003

(65) Prior Publication Data

US 2003/0113566 A1 Jun. 19, 2003

Related U.S. Application Data

(62) Division of application No. 09/994,787, filed on Nov. 28, 2001, now Pat. No. 6,544,596.
(60) Provisional application No. 60/253,738, filed on Nov. 29, 2000.

(51) Int. Cl.[7] .................... B32B 27/38; B32B 27/40; B32B 9/04; B32B 27/00
(52) U.S. Cl. ................. 428/413; 428/423.1; 428/424.2; 428/448; 428/500
(58) Field of Search ............... 428/411.1, 413, 428/423.1, 447, 448, 451, 452, 500, 515, 507, 511, 537.1, 424.2, 537.5

(56) References Cited

U.S. PATENT DOCUMENTS

| | | | |
|---|---|---|---|
| 4,582,889 A | * | 4/1986 | Yamaguchi et al. .......... 528/59 |
| 4,818,367 A | * | 4/1989 | Winkler ....................... 208/23 |
| 6,231,967 B1 | * | 5/2001 | Neukirchen ................. 428/332 |
| 6,544,596 B2 | * | 4/2003 | Clemens et al. ......... 427/407.1 |

* cited by examiner

Primary Examiner—Sheeba Ahmed
(74) Attorney, Agent, or Firm—Clark & Brody

(57) ABSTRACT

A coating system comprises a basecoat of an thermosetting asphalt extended, chemically cross linked-urethane/epoxy hybrid basecoat resting on a substrate, preferably a porous substrate such as concrete or wood that off-gas when coated with a thermoplastic material; and a thermoplastic powder coating topcoat overlying at least the base coat. The thermosetting basecoat composition consisting essentially of, in weight percent based on final formulation, and between 10 and 90% of a petroleum asphalt; between 10 and 90%, of a hydroxy-terminated homopolymer; and between 0.1 and 30% of a functional epoxy reactive diluent for reducing the viscosity of the composition; and further up to 5% of a surfactant for improving surface imperfections, up to 5% of an anti-oxidant; and up to 25% of a thickening agent.

14 Claims, 2 Drawing Sheets

COATING SYSTEM FOR A POROUS SUBSTRATE USING AN ASPHALT-CONTAINING THERMOSETTING BASECOAT COMPOSITION AND A THERMOPLASTIC TOP COAT COMPOSITION

This application is a divisional application of Ser. No. 09/994,787 filed on Nov. 28, 2001 now U.S. Pat. No. 6,544,596, which is based on provisional patent application No. 60/253,738 filed on Nov. 29, 2000.

FIELD OF THE INVENTION

The present invention relates to an engineered composite system, system component compositions and methods of use, and in particular to a system employing a thermosetting asphalt extended cross-linked hybrid basecoat for resting on a porous substrate, and for receiving a thermoplastic top coating.

BACKGROUND OF THE INVENTION

A number of coating materials have been proposed for thermal field applied applications, particularly flame-sprayed coatings. One problem with these types of field-applied coatings is that the substrate may be porous, e.g., wood or concrete, and is subject to off-gassing or thermal decomposition. Consequently, it is very difficult to coat these types of materials.

Accordingly, there exists a need for improved coating systems and compositions to solve the problem of coating porous substrates.

The present invention solves this need by providing a field applied coating system that is ideally adapted for porous substrates.

SUMMARY OF THE INVENTION

It is a first object of the present invention to provide an improved field applied engineered composite system coating.

Another object of the invention is a field applied and/or shop applied, engineered composite system comprising: 1) an asphalt extended, chemically cross linked-urethane/epoxy hybrid basecoat, 2) an alcohol/silane primer, 3) a thermoplastic powder coating topcoat, 4) a optional fabric or fiber reinforcement layer, and the system components of the basecoat, the topcoat, and the primer.

Other objects and advantages of the present invention will become apparent as a description thereof proceeds.

In satisfaction of the foregoing objects and advantages, the present invention provides a coating system that comprises a basecoat of an thermosetting asphalt extended, chemically cross linked-urethane/epoxy hybrid basecoat resting on a substrate, preferably a porous substrate such as concrete or wood that off-gas when coated with a thermoplastic material; and a thermoplastic powder coating topcoat overlying at least the base coat. An alcohol-silane primer can be on the substrate and surrounding at least a portion of the basecoat while leaving a portion of the substrate exposed, the topcoat overlying both the primer and the portion of exposed substrate.

The system can further comprise a reinforcing layer disposed between the basecoat and the topcoat, and the reinforcing layer can be one of a metallic or non-metallic fiber such as glass, a natural fiber such as cotton, a polymeric fiber, a carbon fiber, or combinations thereof.

The thermosetting basecoat composition comprises, in weight percent based on final formulation:
- between 10 and 90%, preferably 20 and 70, and most preferably 30 and 60% of a petroleum asphalt;
- between 10 and 90%, preferably 20 and 70, and most preferably 30 and 60% of a hydroxy-terminated homopolymer;
- between 0.1 and 30%, preferably 3 and 25, and most preferably 5 and 15% of a functional epoxy reactive diluent for reducing the viscosity of the composition;
- up to 5%, preferably 0.2 and 3%, and most preferably 0.3 and 1.0% of a surfactant for improving surface imperfections;
- up to 5%, preferably 0.2 and 3%, and most preferably 0.3 and 1.0% of an anti-oxidant; and
- up to 25%, preferably 0.1 and 10%, and most preferably 0.5 and 2.0% of an thickening agent.

The basecoat can also comprise an effective amount of a hardener to cross link with the hydroxyl functional polybutadiene and reactive diluent components and active hydrogen contained in the asphalt, wherein the hardener is preferably an isocyanate type hardener, but can be diamine or an equivalent hardener.

The basecoat composition can optionally including one or more of a catalyst in a range between 0.0001 and 5%, preferably 0.005 and 2%, and most preferably 0.1 and 2.0%, polyols for higher strength, other fillers for viscosity adjustment between 0.1 and 75%, functional silanes at 0.001 to 10%, thermal conductivity agents between 0.1 and 75% of the formulation such as zinc oxide for resiliency and conductivity, other fillers such as hollow and/or solid glass spheres (0.001 to 5%), drying agents ranging up to 20 gram/gram of water present, flame retardants in amounts between 0.1 and 60%, corrosion inhibitors ranging from 0.1 and 50%, antistatic agents ranging from 0.1 to 50%, biostabilizers ranging from 0.1 to 10%, chemical blowing agents ranging from 0.1 to 10%, scent additives ranging from 0.1 to 25%, bittering agents ranging from 0.1 to 25%, pigments ranging from 0.1 to 40%, fluorescent whiting agents, ranging from 0.1 to 10%, lubricants, UV stabilizers ranging from 0.001% to 50%, powdered (−20 to −1250 mesh size) thermoplastic materials and optionally 0.001% to 50%, powdered thermoplastic with incorporation of one or more of the following: fillers, thermal conductivity agents, flame retardants, corrosion inhibiters, antistatic agents, biostabilizers, chemical blowing agents, scent additives, bittering agents and pepper, pigments/effects, fluorescent whiting agents, lubricants, plasticizers, etc. (−20 to −1250 mesh size), and plasticizers each ranging from 0.1 to 25%.

A topcoat thermoplastic composition comprises, in weight percent, based on final formulation:
- between 10 and 90%, preferably 20 and 70, and most preferably 30 and 60% of a modified ethylene terpolymer with a temperature stable ester and high acidic functionality;
- between 5 and 95, preferably 20 and 70, and most preferably 30 and 60% of a polyethylene/methacrylic acid copolymer;
- between 5 and 95, preferably 5 and 70, and most preferably 7.5 and 20% of a polyethylene/methacrylic acid copolymer ionomer;
- up to 50% of a coloring pigment;
- up to 5% of an anti-oxidant;
- up to 5% of an ultraviolet stabilizer;
- up to 5%, preferably 0.2 and 3%, and most preferably 0.3 and 1.0% of a surfactant for improving surface imperfections; and up to 25%, preferably 0.1 and 10%, and most preferably 0.5 and 2.0% of a thickening agent.

The topcoat composition can optionally contain one or more of other fillers for viscosity adjustment between 0.1 and 75%, thermal conductivity agents between 0.1 and 75% of the formulation such as zinc oxide for resiliency and conductivity, drying agents ranging up to 20 gram/gram of water present, flame retardants in amounts between 0.1 and 60%, corrosion inhibitors ranging from 0.1 and 50%, antistatic agents ranging from 0.1 to 50%, biostabilizers ranging from 0.1 to 10%, chemical blowing agents ranging from 0.1 to 10%, scent additives ranging from 0.1 to 25%, bittering agents ranging from 0.1 to 25%, pigments ranging from 0.1 to 40%, fluorescent whiting agents, raging from 0.1 to 10%, and lubricants, and plasticizers each ranging from 0.1 to 25%.

A primer composition for use with the composite coating system employing a thermosetting resin basecoat and a heat-applied thermoplastic resin overlying the basecoat consists essentially, in weight percent, of between zero and up to 10% of a silane, a solvent ranging between 80 and 95%, and the balance water. The silane can be one of: an ionic and anionic silane; a methanol, organic phosphonium chloride salt and silane monomer; or any other silane having an active hydrogen.

The method also entails coating at least a portion of a substrate by first mixing the basecoat composition with or without the optional ingredients noted above with an isocyanate hardener to form a thermosetting mixture. The basecoat is applied as a liquid to a substrate, preferably a porous substrate and the basecoat is allowed to chemically crosslink to form a heat dampening basecoat. Then, the topcoat of claims with or without the optional ingredients is thermally applied onto the heat dampening basecoat to a given thickness to coat the substrate. A portion of the substrate can be masked prior to basecoat application. Preferably, the substrate is masked twice, the second mask covering both a first mask and a part of the substrate, the second mask removed after basecoat application to expose the part of the substrate for topcoat application.

One or more of the resin components of the topcoat composition with or without the optional ingredients can be substituted with one or more of the polymers as detailed below.

The topcoat composition can be further modified with the incorporation of one or more of other fillers for viscosity adjustment between 0.1 and 75%, thermal conductivity agents between 0.1 and 75% of the formulation such as zinc oxide for resiliency and conductivity, drying agents ranging up to 20 gram/gram of water present, flame retardants in amounts between 0.1 and 60%, corrosion inhibitors ranging from 0.1 and 50%, antistatic agents ranging from 0.1 to 50%, biostabilizers ranging from 0.1 to 10%, chemical blowing agents ranging from 0.1 to 10%, scent additives ranging from 0.1 to 25%, bittering agents ranging from 0.1 to 25%, pigments ranging from 0.1 to 40%, fluorescent whiting agents, ranging from 0.1 to 10%, and lubricants, and plasticizers each ranging from 0.1 to 25%.

The invention also entails a method of coating at least a portion of a substrate by first mixing the basecoat composition as defined above with an isocyanate hardener to form a thermosetting mixture, and storing the mixture in the absence of atmospheric moisture. Then, the mixture is applied to a substrate, preferably a porous substrate and the basecoat is allowed to chemically crosslink to form a heat dampening basecoat. Then, the topcoat as noted above is thermally applied onto the heat dampening basecoat to a given thickness to coat the substrate. In this method, a reinforcing material can be applied on the basecoat and before the topcoat.

DETAILED DESCRIPTION OF THE INVENTION

Figure 1:
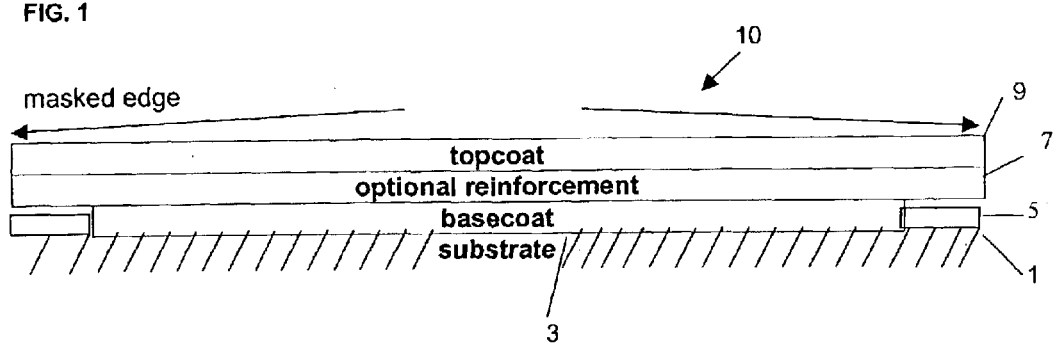
FIG. 1 is an example of a side profile of a coating system.

This invention, when used as a field applied/shop applied coating system, allows the user to thermally deposit (via flame spray technology, arc-spray technology, and other thermal application equipment) a thermoplastic powder coating onto heat sensitive materials. This is accomplished by application of the topcoat onto a heat dampening basecoat. The basecoat is applied as a liquid—and allowed to chemically cross link to form a solid rubber-like material. The primer is used to allow a ⅛" to 1" wide transition of the plastic from the basecoat onto the substrate, allowing the plastic to chemically bond to the substrate, while providing complete encapsulation of the basecoat.

As an example, materials such as concrete and wood thermally decompose and off-gas when thermoplastic is applied via flame spray, arc-spray technology, or other thermal application equipment, making it virtually impossible to coat with this technique.

One solution to this problem is according to the following technique:

1) The substrate is cleaned of contamination and debris. This is accomplished by mechanical (i.e. sand blasting, wire brush, etc.), chemical means (acid wash, etc.), or any other known technique for cleaning.

2) The area to be coated is masked to appropriate dimensions with conventional high temperature masking products. A second masking is applied over the original masking—such that ⅛" to 1" wide area of the substrate is covered, lapping into the area that is to be coated.

3) The heat dampening basecoat is mixed (resin+hardener) and applied to the substrate. A thickness of 30–100 mils is preferred, but other thicknesses can be employed depending on the application.

4) Once the basecoat is applied, and while still un-reacted (up to 2–3 hours), an optional reinforcing layer may be added to the system. One choice of material includes fiber (such as but not limited to: glass fibers, thermoplastic fibers, thermosetting plastic fibers, natural material such as cotton, carbon fibers, metal fibers, and ceramic fibers). The fiber may be applied by hand, spray, or other techniques recognized in the field. It is preferred (but not necessary) to roll the fiber into the basecoat with aid of hand held paint roller (or other applicable techniques). Another option of reinforcement may include reinforcing fabrics (such as but not limited to: glass fibers, thermoplastic, fibers, thermosetting plastic fibers, natural material such as cotton, carbon fibers, metal fibers, and ceramic fibers). It is preferred (but not necessary) to roll the fabric into the basecoat with aid of hand held paint roller (or other applicable techniques). A third option includes a light flocking of thermoplastic powder to be applied and allowed to chemically bond to the basecoat (this flocking step is preferred for best topcoat/basecoat adhesion, but is not necessary).

5) Upon a minimum of 4 hours after the application of the basecoat, the second applied mask is removed to yield ⅛" to 1" of clean substrate (measured between basecoat and first masking line).

6) To the edges of the coating composite (⅛" to 1") where the second mask has been removed, the alcohol/silane primer is applied using any conventional applying technique (spray, brush, etc.). The alcohol quickly evaporates leaving a thin layer of primer deposited onto the substrate. The topcoat is now ready to apply.

7) Once the basecoat is ready, generally around a minimum of 4 hours, the topcoat may be applied via flame spray, arc-spray, and/or thermal application equipment. Care is taken to limit the amount of heat that is transferred to the silane-primed substrate. A thickness of 10–100 mils is preferred, but other thicknesses can be used. The coating is ready for service once the topcoat cools and solidifies—and the masking is removed.

8) The covered basecoat will continue to cure for several days (3–4 weeks) to yield the final composite coating system. Excellent chemical resistance, physical properties, adhesion, serviceability, and corrosion resistance are realized with this composite coating system.

Referring to FIG. 1, an example of a coating system is designated by the reference numeral 10. The basecoat 1 is shown applied to the substrate 3. Surrounding the periphery of the basecoat 1 is the primer 5. FIG. 1 also shows that an optional reinforcing layer 7 can be disposed on the basecoat if desired. The reinforcing material 7 can be glass, a carbon fiber, polymeric fibers, natural fibers, or metallic fibers.

The reinforcing layer 7 is covered with the topcoat 9, with the topcoat extending beyond the edges of the basecoat so as to encapsulate it.

Examples of Commercial Utility of Composite Coating System

A few examples of where this novel system will find utility in the market place include (but definitely not limited to):

1) Coating of concrete (metal, ceramic, etc.) chemical containment vessels, drainage pipes and troughs, and pads. (The chemical resistant properties of the topcoat are superior to conventional coatings).

2) Coating of sewage, water, and gas lines.

3) Coating of roofs (both new and refurbished) . . . homes, commercial buildings, RV vehicles, trailers, outbuildings, sheds, etc.

4) Coating of wood materials (both new and refurbished). For example, the system could be used to coat an existing wood fence, wood patio deck, or wood decking in a horse trailer. The system might also be used to coat wood piling and marine docks (coating is forgiving, such that boat finish would be protected).

5) Coating of heat sensitive, thin metals that would normally warp by utilization of flame spray. For example, pick-up beds.

6) Coating of swimming pools and decks.

7) Coating of power generators parts, windmills, dam turbines, etc.

8) Coating of amusement park equipment.

9) Coating nuclear plant equipment (loading the topcoat and basecoat with powder Tungsten, or other like materials, allows the composite to shield against certain levels of radiation).

10) Coating of space exploration equipment.

11) Coating of car wash-pressure washing/steam cleaning containment.

12) Wood or metal play structure and decking (a soft basecoat may prevent injuries).

13) Coating of sunroom and green house floors.

14) Coating of hard to adhere to materials. For example, reasonable adhesion is obtained with the system applied to Teflon© (Teflon© has very low surface energy, thus making it difficult for most materials to adhere).

15) Coating of hard to clean surfaces—such as wash down rooms in food processing plants and various equipment in the food industry.

16) Coating of large structures such as bridges, boat docks, buildings, etc.

17) Coating of oil field equipment/offshore drilling equipment.

18) Coating laboratory floors—where a chemical resistant coating is required. (Also, because the basecoat is rubbery, it is ergo dynamically pleasing for people to stand on . . . semiconductor industry, hospitals, chemical laboratories, and production plants are targeted markets).

19) The topcoat and basecoat can be formulated to be electrically conductive by the addition of materials such as carbon black, stainless steel powder, or silver coated glass spheres, etc. This is useful for industries such as potato plants, where workers are repeatedly shocked via static build-up on the potatoes, due to the friction generated by the conveying equipment.

20) Replacing/displacing current undercoating used on vehicles.

21) Various applications for the military. For example, portable bridges, vehicles, coating the top-deck of Navy aircraft carriers, etc.

22) Coating of maritime equipment, i.e. ocean liners, private boats, buoys, etc.

23) Coating auto-garage floors, maintenance shops, machine shops, etc.

24) Coating earthen water sheds, such that held water does not leak back into the ground.

25) Coating earthen containment ponds, i.e. brine pits.

26) Landscape ponds and water features. Commercial anti-fungicides can be added to prevent barnacle and fungal growth on coating.

27) Coating of earthen/concrete/tile chemical containment ponds.
28) Engine rooms—ships, locomotive, power plant
29) Coating equipment and support facilities for the airplane industry.
30) Repairing potholes in roads.
31) Chemical hopper cars, chemical fill-station pads, etc. for railroads.
32) Coating of locker room floors
33) Lining of waste disposal trucks and containers.
34) Containment coating for plating and anodize lines
35) Coating tile, glass, plastic, etc . . . virtually any material.

Features of the composite coating system include (but definitely not limited to):

1) Correctly installed system adheres to virtually any substrate and is resistant to a wide range of chemicals (−40 to 200 deg F.), where current coatings are not.
2) Enhanced barrier properties to moisture, solvents, chemical vapors, gases such as $O_2$, and flavors, thereby enhancing corrosion protection and performance of the coated part.
3) Enhanced physical properties of the coatings such as modulus and tensile and heat deflection temperatures, due to the reinforcing nature of the composite.
4) Enhanced dimensional stability and reduced shrinkage of the composite coating.
5) System is able to bridge gaps and seems—surviving expansion and contraction of substrate (i.e. concrete expansion seems that thermally cycle through winter and summer). While the final material may be used as a coating, the components of the composite may also find industrial utility as a cast-able elastomer, caulk, sealant, membrane, sponge, foam, adhesive, potting and encapsulating compound, as well as other rubber-fabricated materials. Some examples include: electrical/electronic potting and encapsulation, asphalt extended membranes (construction), waterproofing membranes, roofing, mastics, highway sealants, architectural sealants, chemically resistant coatings, adhesives, pond liners, athletic surfaces, insulating glass sealants, rubber parts, military/aerospace applications, reaction injection molding (RIM), and the automotive industry.

Individual Basecoat Stand Alone Component

Besides the composite system for coating or other applications, the individual system components also have utility on their own as described below. The basecoat may be used as a stand-alone coating for virtually any substrate. Excellent adhesion, corrosion resistance, and bridging of gaps (such as concrete seams) are realized. The basecoat may also find industrial utility as a cast-able elastomer, caulk, sealant, membrane, sponge, foam, adhesive, potting and encapsulating compound, as well as other rubber-fabricated materials.

The basecoat may be applied by the following technique:

1) The substrate is cleaned of contamination and debris. This is accomplished by mechanical (i.e. sand blasting, wire brush, etc.), chemical means (acid wash, etc.) or other conventional cleaning technique.
2) The area to be coated is masked to appropriate dimensions with conventional masking products.
3) The basecoat is applied to the substrate. After a certain amount of time, e.g., 48 hours, the coating is ready for service.
4) The basecoat will continue to cure for several days (3–4 weeks) to yield the final cured properties of the coating. Excellent physical properties, adhesion, and corrosion resistance are realized with this coating.

The developed basecoat provides the following features:

1) The material is a cost-effective plural component system consisting of resin and a hardener. When the two materials are thoroughly mixed together a coating window of approximately 2 hours results, with a cured film resulting in approximately 24–48 hours. By incorporation of appropriate catalysts and/or adjusting the application temperature, this window can be shortened to a matter of seconds (important for spray applied applications to vertical surfaces).
2) The material can be applied by conventional application techniques including, but not limited to: brush applied, squeegee applied, roller applied, trowel applied, and spray applied (the material can be applied at ambient temperatures or warmed upwards of the flashpoint of the resin).
3) The material provides excellent adhesion to a variety of materials. Item tested to date include: concrete, aluminum, steel, glass, fiberglass, plastic, paper, wood, Teflon©, roofing shingles, rubber, ceramic, leather, and synthetic foam.
4) The basecoat material, when used as a stand-alone coating, provides excellent adhesion, chemical resistance, resiliency, impact resistance, flexibility, and elongation. It successfully bridges gaps in areas such as concrete seems.
5) Excellent long-term aging properties.

Thermoplastic Topcoat(s) (Stand-alone)

The topcoat, when used as a stand-alone primer-less coating, provides excellent adhesion and corrosion protection to metals and glass. The coating may be applied via flame spray and other thermal application equipment, and may be applied by conventional powder-coating techniques (i.e. corona spray, tribostatic spray, fluid-bed dipped, electrostatic fluid bed, flocked, etc.) There are many items, found in industry, that lend themselves to be powder coated: Patio furniture, garden tools, mail boxes, appliances—dryer drums, front and side panels of ranges and refrigerators, washer tops, water heaters and dishwasher racks, automotive parts, closet shelving, automotive products—bumpers, hubcaps, architectural pieces—aluminum window and door frames, modular furniture decorative trim, door handles, metal fence, pipe, carts, bicycles, lawn mowers, filing cabinets, glass, medical equipment, chemical plants, sporting goods, light poles, bike racks, brackets, etc.

The chemistry for the general topcoat formulation (based on polyethylene), for the composite coating system, is provided below). Other topcoat resin chemistries and additives may be utilized to provide for different end uses, such as—more abrasion resistance, increased hardness, different chemical resistance profiles, different service temperatures, etc. Coatings can include (but not limited to) these plausible thermoplastic resin systems: ethylene-vinyl acetate, polypropylene, ethylene-methyl acrylate EMA and ethylene-methyl methacrylate EMM/polyethylene copolymers, polyethylene, polyethylene acid terpolymers, polyethylene ionomers, polyamide co- and ter-polymers, thermoplastic elastomers (TPE's), acrylonitrile-butadiene-styrene, acrylonitrile halogenated polyethylene, acrylonitrile halogenated styrene, acrylic-styrene-acryonitrile, cellulose acetate, cellulose acetate-butyrate, cellulose acetate-propionate, halogenated polyethylene, halogenated polyvinyl chloride, polymonochlorotrifluoroethylene, diallyl phthalate, ethyl cellulose, ethylene-chlorotrifluroethylene, ethylene-propylene, tetrafluoroethlyene-hexafluoropropylene-vinylidene fluoride ter-polymer, EVOH, PEBA, ethylene-tetraflurethylene, fluorinated ethylene-propylene, high-impact polystyrene, vinyl modified epoxy, liquid crystal polymer, methacrylateo-butadiene-styrene, polyamide, polyamide-imide, polyacrylonitrile, polybutylene, polybutylene terephthalate, polycarbonate, polychlorotrifluoroethylene, polyphenylene ether copolymer, polyetherether ketone, polyphenylene ether homopolymer, polyetherimide, polyethylene oxide, polyethersulphone, phenly-formaldeahyde, perfluoroalkoxy, polyimide, polyisobutylene, polyisoethylene, paramethylstyrene, polymethylpentene, polyphenylene oxide, polyphenylene sulfide, polystyrene, polytetrafluoroethylene, polyurethane (polyester and polyether backbone), polyvinyl chloride, polyvinylidene fluoride, polyvinyl fluoride, styrene-acrylonitrile, styrene maleic anhydride, polytetra fluorethylene, urea-formaldehyde, vinyl acetate-ethylene, polyacetal, polyacrylic, polyalkyd, polyallylic esters or allyis, cellulosic esters, halogenated polyalkylene ether, cyanate/cyanamide polymers, halogenated epoxies, cycloaliphatic epoxys, epoxyimide polymers, polyester polymers, polyether polymers, and polyphenylene.

In addition, modifications to the above listed material, including silane grafting, maleic anhydride grafting, acrylic acid grafting, and grafting of any functional group containing an active hydrogen may be used. For example, polyethylene may be modified (peroxide grafting) to include silane, maleic anhydride, acrylic acid, or virtually any functional group containing an active hydrogen. Also, co- and poly-polymers utilizing the above resins and/or modified resins may be used.

Furthermore, any virtual array of blends utilizing the aforementioned thermoplastic resins, modified resins, or co- and poly-polymers of above listed resins may be used.

All coatings can be made available in virtually an unlimited array of color selections and finishes. From fluorescent to jet-black; from smooth-high gloss, dimple and pinhole free surface-to wrinkled textures; as well as colors and finishes between these extremes.

Thermoplastic Powder Coatings are Applied by Various Methods

Coating of a part generally requires two steps (but not necessarily in this order): 1. deposition of the powder, and 2. Oven (heat) to flow the powder into a film. A spray booth is very desirable, and in some instances necessary. The booth keeps the powder overspray contained so that it is not a hazard (high concentrations of air-borne powder can be an explosion hazard). Other hazards that are curbed include breathing of the dust. The booth also promotes good "industrial hygiene." Also, by use of a spray booth, powder overspray may be reclaimed for reuse.

Figure 2:
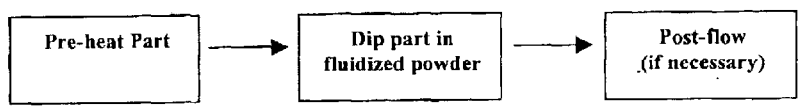
FIG. 2 is an example of a fluid bed dipping coating technique.

FIG. 2 shows one of the simplest methods in which to coat parts. A fluidized-bed canister is filled with powder. A small amount of air is introduced into the bottom of the canister and rises through a porous fluidizing board. This "fluffs" the powder and causes it to behave like a liquid, or to become "fluidized." The part is preheated and dipped into the fluidized bed, and treated afterwards if necessary with additional heating for the proper finish.

Figure 3:
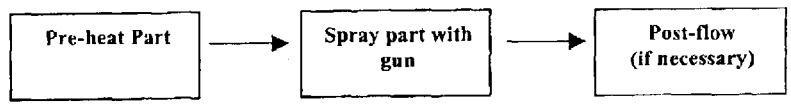
FIG. 3 is one method of an electrostatic spray coating technique.
Figure 4:
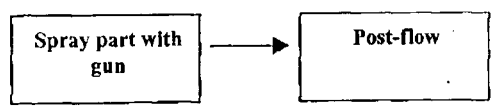
FIG. 4 is a second method of an electrostatic spray coating technique.

FIGS. 3 and 4 illustrate electrostatic spray methods. As the powder paint cloud gently leaves the spray gun, it is charged with static electricity to attract the powder paint to the part being coated. The part is then placed in an oven (typically 250–600° F.) and allowed to melt and flow to a "proper durable and beautiful finish." In FIG. 3, the part can be preheated.

Figure 5:
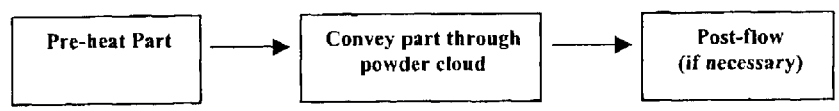
FIG. 5 is one method of an electrostatic fluid-bed coating technique.
Figure 6:
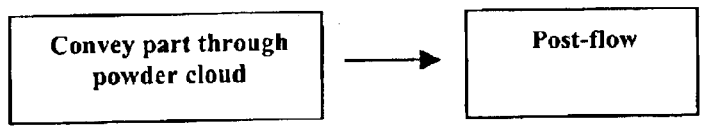
FIG. 6 is a second method of an electrostatic fluid-bed coating technique.

FIGS. 5 and 6 show electrostatic fluid-bed methods. In the electrostatic fluidized bed process, powder particles are aerated in a fluidizing chamber. The powder is electrostatically charged by ionized air, which passes through a porous plate at the base of the fluidized bed. The part is preheated in FIG. 5 prior to passing through the cloud of particles, whereas FIG. 6 merely conveys the part through the cloud, and then subjects the part to post heating if necessary. The charged powder particles, which repel one another, rise above the fluidizing bed, forming a cloud of charged particles. A hood above the fluidizing bed prevents powder from entering the plant atmosphere. When a grounded part is placed in the cloud or conveyed through it, the charged particles are attracted to the part. The particles are more attracted to exposed areas than to those already coated, which provides a uniform coating on the part. Coating thickness is largely controlled by adjusting the applied voltage to the charging media and the amount of time the part is within the cloud. Because of the high voltage capability of the charging media, sufficiently great potential exists between the powder coating and most substrates, which permits even natural insulators to be coated. The unique air ionization process charges the powder without allowing the operator, the part or the powder to come in contact with the charging media.

Figure 7:
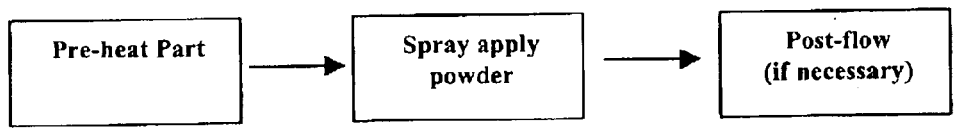
FIG. 7 is one method of a tribostatic spray coating technique.
Figure 8:
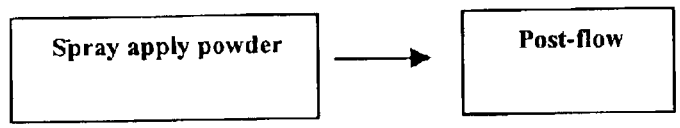
FIG. 8 is a second method of a tribostatic spray coating technique.

FIGS. 7 and 8 show tribostatic spray methods. Tribostatic is the work used to describe a static charge that builds when two dissimilar materials are rubbed together—This is a cost effective method of applying coatings. It is usually the best method for applying a second coat over an existing finish. FIG. 7 shows the method with a preheating step, with FIG. 8 showing just the powder application step and the post flow step.

Figure 9:
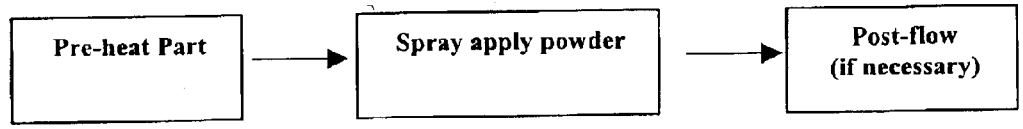
FIG. 9 is an example of a flocking spray coating technique.
Figure 10:
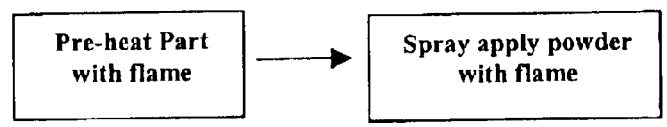
FIG. 10 is an example of a flame- and arc-spray coating technique.

FIG. 9 shows a flocking spray method. This method deposits an aerosol of powder to a hot substrate. The powder hits the hot part and partially melts to the substrate. The part is then placed back in the oven for the post flow FIG. 10 shows a flame spray and arc-spray technique. The thermoplastic powder is siphoned into a propane/compressed air-fueled flame. The flame melts the powder and deposits it onto the substrate.

The developed topcoat provides the following features
 a) Superior corrosion protection and chemical resistance (generally resistant to most acids, bases, oils and solvents).
 b) Exceptional adhesion, including when applied over a basecoat.
 c) Repairable.
 d) Flexible.
 e) Custom colors.
 f) Exceptional impact strength and chip resistance.
 g) Finish can be smooth or textured.
 h) Abrasion resistant.
 i) Environmentally friendly, 100% solids, little or no VOC's, solvents, cross-linking agents and no heavy metals.
 j) Potable water and direct food contact formulations available.
 k) Excellent UV-stability.
 l) Physicals such as hardness, gloss, etc. may be adjusted.
 m) Good operating temperature properties (−40 to 200 deg° F.).

n) Low smoke development when in fire.
o) No cure time—coating may be put in service when cooled.
p) Safe for disposal in public landfill.
q) No shelf life or pot life restrictions.
r) Electrically insulating to electroconductive formulations possible.
s) There are no runs or drips as there is with liquid coatings.
t) Over spray is reused
u) Special effects, additives, and performance requirements can be readily formulated Primer/Topcoat (Stand-alone)

The alcohol/silane primer is used to increase adhesion of the topcoat to substrates, particularly difficult to adhere to substrates (anodized metals, stainless steel, etc). The primer is deposited, solvent is allowed to flash (evaporate), and the part is then coated according to the examples given above. This ambient applied, cost effective, primer increases the adhesion of the thermoplastic topcoat to substrates.

Description of Preferred Manufacture, Materials, and Composition Ranges for Basecoat Manufacture—Basecoat 1) One preferred basecoat formula (based on weight % of final formulation) is:

| | |
|---|---|
| 44.5% | Petroleum Asphalt (U.S. Oil and Refining Co. PG 52-28) |
| 44.5% | 1,3-butadiene, homopolymer, hydroxy-terminated (Elf Atochem North America, Inc. RT45HTLO) |
| 9.0% | 1,4 butanediol diglycidyl ether (Shell Heloxy Modifier 67) |
| 0.5% | Acrylic Oligomer (Estron Chemical, Inc. Resiflow LV-67) |
| 0.5% | 2,2'-Methylenebis (4-methyl-6-tertiarybutyl phenol) (Cytec Cyanox 2246) |
| 1.0% | Amorphous Fumed Silica (Degussa-Hüls Corp. Aerosil 200) |

2) Blending and one preferred manufacturing method for the basecoat formula:

The petroleum asphalt is heated to 140–360 deg F. and removed from the heat source. To this warm material the hydroxy-terminated 1,3-butadiene homopolymer is added with the aid of mechanical stirring. Next, the remainder of ingredients are added and the resin is mixed with mechanical stirring until a uniform dispersion is obtained. The resin is allowed to cool completely to room temperature and packaged for resale. It is preferred to blend all components under gaseous nitrogen or vacuum, such that oxidative degradation of the resin is curbed.

3) To this blended resin a hardener, e.g., a modified diphenylmethane diisocyanate)—is added at 1:9 resin by wt. (corresponding to a NCO/OH ratio of approximately 1.10). Of course, other hardeners may be used as would be recognized by those skilled in the art.

4) Description of broad ranges of ingredients (more narrow ranges are found in the claims):

Petroleum Asphalt

The asphalt is incorporated into the formulation to provide tack, and to extend the hydroxy-terminated, 1,3-butadiene homopolymer (cost effective). Lower loadings of asphalt will produce a harder, less elastic material—as well as reducing the viscosity of the blended resin system. Higher loadings of the asphalt will produce a more viscous resin, which cures to yield a softer material that has more residual tack and elasticity. A broad range of 10–90%, final formulation is obtainable. Materials such as petroleum asphalt grade PG 64-22 are noted to increase the tensile properties by upwards of 20%.

In addition, other petroleum based, hydrocarbon crudes (of approximately same molecular weight) may substitute. Petroleum hydrocarbon oil may also be used in conjunction with the asphalt, as an extender and diluent. Other thermoplastic and non-thermoplastic resins, and other thermoplastic and non-thermoplastic resins with select fillers (such as hollow glass spheres, for example), may be added at a range of 10–90% to modify end physical (such as topcoat/basecoat inter-adhesion).

A list of generally compatible extenders that may substitute include: dioctyl phthalate, diundecyl phthalate, tricresyl phosphate, halogenated paraffin, aromatic process oil, naphthenic process oil, alkyl naphthalenes, asphalt, coal tar, linseed oil, tung oil, detergent alkylate, and others as recognized by those skilled in the art.

1,3-butadiene, homopolymer, hydroxy-terminated

The hydroxy-terminated, 1,3-butadiene homopolymer is incorporated into the formulation to provide resiliency and crosslinkability (through the hydroxyl groups on the terminus of the butadiene polymer). Increasing the loading of this ingredient (and the corresponding amount of hardener) will result in a harder material that has reduced elasticity. Decreasing the ingredient (and the corresponding amount of hardener) will result in a softer mastic with greater elongation properties. A range of 10–90%, final formulation is obtainable. In addition, other functionalized polymers, with either aromatic or aliphatic type backbones may be substituted (also copolymers and modified homo/co polymers). The functional groups may include: alkyd, hydroxy, carboxy, amine, and virtually any other compound containing an active hydrogen.

1,4 butanediol diglycidyl ether

The diglycidyl ether reactive diluent is used to reduce the viscosity of the resin and cross-link with the hardener. Increasing the loading of this ingredient (and the corresponding amount of hardener) will result in a harder material that has reduced elasticity. Decreasing the ingredient (and the corresponding amount of hardener) will result in a softer mastic with greater elongation properties, although the viscosity increases dramatically. This material provides for better topcoat-basecoat adhesion. A range of 0.1–30%, final formulation is obtainable. In addition, other functionalized polymers, with either aromatic or aliphatic type backbones may be substituted. The functional groups may include: alkyd, hydroxy, carboxy, amine, and virtually any other compound containing an active hydrogen. The polymers may have a range of functionality/molecule. Harder, less flexible films are expected as functionality increases. Also, viscosity may range from 1 cP upwards of 5000 cP. It, is also plausible to consider non-reactive diluents, such as plasticizers, oils, etc. Other glycilyl reactive diluents can be used as well. As another example, a mono-functional glycidyl ether diluent results in a very soft "gel" mastic, which enhances the system where foot traffic and ergonomics are important.

Surface Modifiers (Surfactants)

The acrylic is used to improve flow, eliminate air entrapment, orange peel, pinholes, craters, and other surface imperfections. This ingredient improves the flexibility of the coating and provides for better topcoat-basecoat adhesion. A range of 0.1 to 5%, final formulation is obtainable. Other acrylic (supplied as both liquid or on solid carrier particles) and non-acrylic modifiers yield virtually the same results (i.e., benzoin and Acetylenic diol's). Anti-foam agents, such as silicone oils may be used, when the basecoat is used as a stand alone coating. Ranges are from 0.1 to 5%, final formulation. Other material, typically considered to be utilized as surfactants by formulators in the art, may be utilized.

2,2'-Methylenebis (4-methyl-6-tertiarybutyl phenol)

This material is used as an anti-oxidant to protect the cured resin from thermal decomposition, upon exposure to the flame applied topcoat. Higher loading levels show improvement in thermal stability, where lower levels decrease the thermal stability of the basecoat. Other phenol and "Non-phenol" type anti-oxidants generally give the same results. An example includes thioester antioxidants. Loadings range from 0.01 to 5%, final formulation.

Light Stabilizers

If the basecoat is to be used as a stand-alone coating, it may be necessary to stabilize for UV exposure. Light stabilizers that may be incorporated include: benzophenone, benzotriazole, triazine, benzoxazinone, hindered amines, and hindered benzoate. Loadings may range from 0.01% to 5%, final formulation.

Amorphous Fumed Silica

This material is used as a thickening agent/anti-sag agent. It prevents phase separation of material when stored for long periods of time. Decreasing the loading of this material into the resin decreases the viscosity. Increasing the loading of this material (up to 10%) increases the viscosity, such that the resin is trowel-able, to apply to vertical surfaces. The addition of the silica does not significantly affect the performance of the basecoat. The material may be loaded at 0.01 to 10%, final formulation. Other thickening agents that may substitute include, but are not limited to the materials listed in the filler portion of this disclosure. Loadings are anticipated to be 0.1 to 25%, final formulation.

Modified Diphenylmethane Diisocyanate

The MDI is used to cross link with the hydroxy terminated polybutadiene, diglycidyl ether reactive diluent, and active hydrogens contained in the petroleum asphalt. It is incorporated according to stoichiometric equivalents. Increasing the amount of hardener results in a harder film, and reducing the amount of hardener results in a softer film. By choosing the correct MDI (or other poly-functional isocyanates) variable such as pot life and end physicals may be adjusted. Other multi-functional isocyanates may also be used including: aliphatic, aromatic, TDI, etc. Also, diamines and other hardeners recognized by those skilled in the art may substitute.

Catalysts

Catalysts may be used to accelerate the crosslinking of the basecoat. Three candidates have been found to date: 1) dibutyltin dilaurate, 2) aminopropyltriethoxysilane, and 3) triethylenetetramine. In general, most amines will catalyze the reaction, as well as, the tin dilaurate. Many catalysts, known in the urethane formulation art, may be utilized. Loadings are typically at 0.0001 to 5%, final formulation.

Polyols

Physical properties of the system can be improved by the addition of auxiliary polyols to the formulation. A wide variety of short chain diols (i.e., polyether and polyester backbone) may be employed, however, Voranol 220–530 (phenyl diisopropanolamine) was found to be the most effective. The use of a short chain diol in conjunction with the required additional isocyanate increases the urethane concentration in the final polymer backbone. This combination leads to increased hydrogen bonding between polymer chains and thus higher strength properties in the cured elastomer. The same effects can be noted when short chain diamines or mixed alcohol diamines are employed as auxiliary reactants with the system.

Fillers

Fillers common the industry (but not limited to) include: aluminum oxide, calcium carbonates, dolomite, calcium sulfate, silicates, glass spheres (solid and hollow), asbestos, talk, kaolin, mica, feldspar and nepheline syenite, wollastonite, silicate spheres, silica, natural silicas, synthenic silicas, adhesion promoters (silanes, titanate, zirconate, and aluminate coupling agents), molybdenum disulfide, polytetrafluoroethylene, barium sulfate, metals and metal oxides, aluminum hydroxide, carbon, fibers (natural and synthetic—basalt, carbon polyamide, glass, boron, ceramic), electrically conducting fillers (stainless steel, carbon, carbon fibers, silver coated glass particles), radar absorbing materials, radiation shielding/EMI shielding (Tungsten powder), magnetic additives (strontium ferrite and ceramics), rubber (virgin and re-processed), and sound dampening materials may be incorporated into the resin to dilute the cost, and/or alter physical properties. Loadings for fillers may range from 0.01 to 75%, final formulation. Typically increased loadings of fillers will cause the viscosity of the final formulation to increase.

Thermal Conductivity Agents

Zinc Oxide (and other materials such as ceramics), in addition to reinforcement, also provides resilience and heat conductivity. This is an important filler, where enhanced thermal conductivity is of concern. Loadings are typically at 0.1 to 75%, final formulation. Anti-thermal conductive materials (glass and ceramic) may also be used for the opposite effect. Loadings are at 0.1 to 75%, final formulation.

Drying Agents

Alkali-metal alumino-silicate materials may be used as a molecular sieve adsorbent for static dehydration in the formulation, increasing shelf life of the product. This material is also useful when the removal of water is of interest; i.e., One-Step mechanism, as described below. PTSI (para-Toluenesulfonyl Isocyanate) reacts toward active hydrogen atoms, making it ideal for scavenging water and other isocyanate reactive groups (such as free acid in powdered aluminum alkanoates and active hydrogen present in carbon black pigments). This prevents the thickening of the formulation during storage. This material is especially useful for One-Step mechanisms. Loadings are typically 13 grams/gram of water.

Flame Retardants

Flame retardants for the formulation are plentiful. Some of these include (but are not limited to): halogen liberating flame retardants, antimony oxide, phosphorous containing agents, modified silicones, alumina trihydrate, magnesium hydroxide, organically modified montmorillonite clay, expandable graphite, boric oxide, zinc borate, etc. Loadings are typically 0.1 to 60%, final weight.

Corrosion Inhibitors

Corrosion protection agents may include polyaniline, amino tri (methylene-phosphonic acid)—(ATMP), ammonium benzoate, sodium nitrite, 2-benzothiazolylthiosuccinic acid (MBTS), primary, secondary, and tertiary aliphatic amines, aliphatic diamines, cycloaliphatic and aromatic amines, polymethylimines, long-chain ethanolamines, imidazolines, amine salts of carbonic, carbamic, acetic, benzoic, oleic, nitrous, and chromic acids, acetylenic alcohols, lauric alcohol, alkyl chromates, organic esters of nitrous acid, organic esters of phthalic acid, organic esters of carbonic acid, nitronaphthalene, nitrobenzene, etc. The anticipated loadings may range from 0.1 to 50%, final formulation.

Antistatic Agents

Antistatic agents prevent dust attraction, discharge process that may damage the product (i.e., packaging and handling of electronic chips), and curbing spark discharge that can produce serious accidents. Additives in loadings ranging between 0.1 to 50%, final formulation include:
  a) Cationic compounds (best effect in polar substrates), generally consisting of a voluminous cation which often contains a long alkyl residue (i.e., quaternary ammonium, phosphonium or sulfonium salt, etc.). In most cases, the anion is the chloride, methosulfate or nitrate originating from the quaternization process.
  b) Anionic compounds, mostly an alkyl sulfonate, sulfate or phosphate, a dithiocarbamate or carboxylate, alkali metals, etc.
  c) Nonionic compounds, uncharged surface-active molecules including: polyethylene glycol esters or ethers, fatty acid esters or ethanolamides, mono- or diglycerides or ethoxylated fatty amines, etc.

Biostabilizers

These materials are often used as package preservative, can corrosion inhibitor, mold inhibitor (fungicide), and tannin stain blocking agent. Several commercially available agents are available, which typically base their chemistry on organic materials (i.e., Buckman Laboratories). Other materials may include zinc oxide, copper oxides, etc. The anticipated loadings range between about 0.1 to 10%, final formulation.

Chemical Blowing Agents

Chemical blowing agents, when incorporated into the basecoat, release small amounts of gas—resulting in a foamed material. Examples include (but are not limited to) a mixture of sodium bicarbonate and acetic acid, chlorofluorocarbons, etc. This material typically ranges between about 0.1 to 10%, final formulation.

Scent Additives

Scent additives (such as Stanley S. Schoenmann's products) provide an array of different fragrances that may be incorporated into the formulation. Loadings range between about 0.1 to 25%, final formulation.

Bittering Agents and Pepper

Bitter agents such as ground buffalo gourd may be incorporated into the coating to prevent damage by livestock (via oral degradation of the coating). Other ingredients include cyanine pepper powder, etc. Loadings are typically 0.1 to 25%, final formulation.

Pigments/Effects

Carbon black will cause tensile, modulus, tear, and hardness to increase, as the carbon loading is increased. In addition, carbon black gives the formulation the color of black. Typical loadings range from 0.1 to 40%, final formulation. Many other organic and inorganic pigments may be used. Specialty pigments, such as pearl and glow-in-dark may be incorporated.

Fluorescent Whiting Agents

Materials such as 2,2'-(2,5-thiophenediyl) bis[5-tert-butylbenzoxazole] are often used to provide brighter looking colors. This material may be incorporated into the basecoat as a mechanism in which to detect pinholes and defects in the topcoat. Typical loadings are 0.1 to 10%, final formulation. The method of detecting pinholes and defects in the topcoat is as follows: 1) the system is correctly installed, and 2) a blacklight is scanned over the topcoat—pinholes and defects (thin spots) are illuminated (by the fluorescent whiting agent in the basecoat), thus detected. Once detected, additional topcoat may be applied to seal the defect areas.

Lubricants

Incorporation of lubricants may provide useful properties to the system. Typical lubricants include: fatty alcohols ant their dicarboxylic acid esters, fatty acid esters of glycerol and other short chain alcohols, fatty acids, fatty acid amides, metallic soaps, oligomeric fatty acid esters (fatty acid complex esters), fatty acid esters of long-chain alcohols, montanic acid, esters and soaps, polar polyethylene waxes and their derivatives, nonpolar polyolefin waxes, natural and synthetic paraffin waxes, fluoropolymers, and molybdenum disulfide.

Plasticizers

Typical plasticizers that may be used include phthalates, monocarboxylic acid esters, acetates, propionates and butyrates, esters of ethylbutyric and ethylhexanoic acid, glycolic acid esters, benzoic acid esters, epoxidized fatty acid esters, plasticizers based on phthalic acids, aliphatic dicarboxylic acid esters, phosphates, polyester plasticizers, trimellitic acid esters, citric acid esters, sulfonic acid esters and sulfamides, alcohols, ethers and ketones, abietic acid esters, polymerizable plasticizers, hydrocarbons and halogenated hydrocarbons. Ranges are from 0.1 to 25%, final weight.

5. An alternative one-step mechanism is as follows.

This basecoat material may also be formulated into a one-step urethane reaction.

For this manufacturing process, the components of the desired formulation are weighed; i.e., hydroxy-terminated, 1,3-butadiene homopolymer resin, petroleum asphalt, filler (s), extender oil(s), anti-oxidants, plasticizers, and catalyst. For example, one preferred basecoat formula (based on weight % of final formulation) is:

| | |
|---|---|
| 44.5% | Petroleum Asphalt (U.S. Oil and Refining Co. PG 52-28) |
| 44.5% | 1,3-butadiene, homopolymer, hydroxy-terminated (Elf Atochem North America, Inc. RT45HTLO) |
| 9.0% | 1,4 butanediol diglycidyl ether (Shell Heloxy Modifier 67) |
| 0.5% | Acrylic Oligomer (Estron Chemical, Inc. Resiflow LV-67) |
| 0.5% | 2,2'-Methylenebis (4-methyl-6-tertiarybutyl phenol) (Cytec Cyanox 2246) |
| 1.0% | Amorphous Fumed Silica (Degussa-Hüls Corp. Aerosil 200) |

The materials are charge to a suitable mixing device and allowed to mix until the ingredients are well dispersed. This "master-batch" may be degassed under vacuum—it may also be necessary to dry fillers at elevated temperatures to remove moisture. If degassing is not possible, a gaseous nitrogen blanket should be used. The petroleum asphalt is heated under dry nitrogen to 140–360 deg F. and removed from the heat source. To this warm material the hydroxy-terminated 1,3-butadiene homopolymer is added with the aid of mechanical stirring. Next, the remainder of ingredients are added and the resin is mixed with mechanical stirring until a uniform dispersion is obtained. The resin is allowed to cool completely to room temperature. Next, the calculated amount of di- or polyisocyanate is added to the mixture to give the desired NCO/OH ratio. Optimum properties are usually obtained at NCO/OH ratios between 1.0 and 1.2. For our system modified diphenylmethane diisocyanate is added at 1:9 resin by wt. (corresponding to a NCO/OH ratio of approximately 1.10). Of course, other hardeners may be used as would be recognized by those skilled in the art.

The completed formulation is mixed until homogeneous (the reaction of the isocyanate with hydroxyl groups will generate heat—a cooling jacket may be required on the mixing vessel). The finished material is then pumped into suitable containers (care is taken not to expose formulation to atmospheric moisture).

The system, prepared as described above, is applied as a one step curing basecoat. The applied material reacts with atmospheric water to give urea structures, or can form allophanate crosslinks (especially at elevated temperatures). Upon proper cure (longer cure to be anticipated compared to A+B mixture) no differences in properties should be noted, as compared to the A+B mixture. Potlifes and physicals can be tuned for this system by engineering the formulation properly. All of the above auxiliary ingredients may be incorporated into this system, as outlined above.

Alternatively, isocyanate functional silanes may be utilized in place of the poly-functional isocyanate. For example, one preferred basecoat formula (based on weight % of final formulation) is:

| | |
|---|---|
| 44.5% | Petroleum Asphalt (U.S. Oil and Refining Co. PG 52-28) |
| 44.5% | 1,3-butadiene, homopolymer, hydroxy-terminated (Elf Atochem North America, Inc. RT45HTLO) |
| 9.0% | 1,4 butanediol diglycidyl ether (Shell Heloxy Modifier 67) |
| 0.5% | Acrylic Oligomer (Estron Chemical, Inc. Resiflow LV-67) |
| 0.5% | 2,2'-Methylenebis (4-methyl-6-tertiarybutyl phenol) (Cytec Cyanox 2246) |
| 1.0% | Amorphous Fumed Silica (Degussa-Hüls Corp. Aerosil 200) |

The materials are charge to a suitable mixing device and allowed to mix until the ingredients are well dispersed. This "master-batch" may be degassed under vacuum—it may also be necessary to dry fillers at elevated temperatures to remove moisture. If degassing is not possible, a gaseous nitrogen blanket should be used. The petroleum asphalt is heated under dry nitrogen to 140–360 deg F. and removed from the heat source. To this warm material the hydroxy-terminated 1,3-butadiene homopolymer is added with the aid of mechanical stirring. Next, the remainder of ingredients are added and the resin is mixed with mechanical stirring until a uniform dispersion is obtained. The resin is allowed to cool completely to room temperature. Next, the calculated amount of isocyanate functional silane is added to the mixture to give the desired NCO/OH ratio. Optimum properties are usually obtained at NCO/OH ratios between 1.0 and 1.2.

The completed formulation is mixed until homogeneous (the reaction of the isocyanate with hydroxyl groups will generate heat—a cooling jacket may be required on the mixing vessel). The finished material is then pumped into suitable containers (care is taken not to expose formulation to atmospheric moisture).

This prepared system is applied as a one step curing basecoat. The applied material crosslinks (cures) when exposed to moisture.

6. An alternative two-step mechanism, utilizing different crosslinking mechanisms.

In many conventional applications, it is desirable or essential to utilize a two-step reaction sequence, wherein an isocyanate terminated prepolymer (quasi-pre-polymer) is first formed and subsequently converted to a high molecular weight cured elastomer by further reaction with glycols, diamines, or other chain extending agents.

For example, one preferred basecoat formula (based on weight % of final formulation) is:

| | |
|---|---|
| 44.0% | Petroleum Asphalt (U.S. Oil and Refining Co. PG 52-28) |
| 44.0% | 1,3-butadiene, homopolymer, hydroxy-terminated - converted to a prepolymer (NCO/OH ratio = 1.1) |
| 1.0% | Benzoyl chloride |
| 9.0% | 1,4 butanediol diglycidyl ether - converted to a prepolymer (NCO/OH ratio = 1.1) |
| 0.5% | Acrylic Oligomer (Estron Chemical, Inc. Resiflow LV-67) |
| 0.5% | 2,2'-Methylenebis (4-methyl-6-tertiarybutyl phenol) (Cytec Cyanox 2246) |
| 1.0% | Amorphous Fumed Silica (Degussa-Hüls Corp. Aerosil 200) |

The petroleum asphalt (100 gm), 1,3-butadiene, homopolymer, hydroxy-terminated (100 gm) and 1,4 butanediol diglycidyl ether (20.5 gm) was charged into a five-gallon working capacity 316 stainless steel jacketed autoclave equipped with a mechanical stirrer, thermowell, charging port, vacuum and nitrogen lines, and a bottom exit port. The autoclave was sealed, stirrer turned on, and evacuated to 30 mm mercury.

The vessel was then heated to 225 deg F., via heated oil passed through the vessel jacket. Approximately 3 hours was required to heat the charge. The vessel contents were degasses and stirred for and additional 30 minutes at 10 mm mercury. The contents were then cooled to 100 deg F.

The pressure was adjusted to 60 mm mercury and benzoyl chloride added. The addition of benzoyl chloride was found to greatly enhance the stability of the prepolymer. After stirring for 10 minutes, the diisocyanate with an equivalent weight of 136 (corresponding to a necessary 34 gm load) was added over a 5 minute interval. The exotherm was found to increase the temperature by 20 deg F.

The vessel contents were heated to 150 deg F. and allowed to stir for 1 hour. The remainder of the ingredients were then added. The mixture was allowed to stir for a two hour period at 60 mm mercury. The finished material was then transferred into suitable containers—under dry nitrogen (care is taken not to expose formulation to atmospheric moisture).

This prepolymer material may then be cured by use of a variety of chain-extending diols or diamines. We chose a polyether polyol (Dow Voranol 220–530). A weight ratio of 1:5 prepolymer was found to give good result.

Isocyanate prepolymers are widely used for producing high performance elastomers of castable, millable, and moldable types. Other applications include foams, and one and two component coatings, caulks, sealants, etc.

Description of Preferred Manufacture, Materials, and Composition Ranges for Topcoat Manufacture—Topcoat 1) Disclosure of one preferred topcoat formula (based on weight % of final formulation):

| | |
|---|---|
| 41.49% | Acid-modified ethylene terpolymer with temperature stable ester and high acidic functionality (Dupont Bynel CXA 2022) |
| 41.49% | Polyethylene/methacrylic acid copolymer (Dupont Nucrel 599) |
| 10.0% | Polyethylene/methacrylic acid copolymer partially neutralized with sodium (Dupont Surlyn 8670) |
| 5.0% | Grey pigment polymeric dispersion (MA Hanna product #10080332) |
| 0.5% | Antioxidant (Ciba Irgonox 1010) |
| 0.5% | Benzotriazole light stabilizer (Fairmount Chemical Co. Mixxim BB/100) |
| 1.0% | Acrylic Oligomer (Estron Chemical, Inc. Resiflow LV-67) |
| 0.02% | Amorphous Fumed Silica (Degussa-Hüls Corp. Aerosil 200) (post-additive) |

2) One mode of blending and manufacturing of topcoat formula:

All materials are mechanically pre-blended. This blended material is then passed through a 1:24 single screw plastic extruder at a temperature of 240–280 deg F. The extruder melts and disperses the ingredients. The material exits the extruder as a molten strand and is cooled and re-solidified in a water trough. The solidified strand is then pelletized.

The processed pellets are then cryogenically ground to a powder, screened to the correct particle size, and then dried and packaged. The powder is the finished product.

Cryogenic grinding of the material will yield particles of a specific size. For our application, −40mesh seems to work the best for thermal application equipment (−80 for powder coating grade). A range of −35 to −500 mesh may find utility in the marketplace.

To the ground powder, fumed silica may be incorporated at up to 5.0 % by weight to aid in dry flow-ability of the powder.

Other methods of blending can also be employed to produce the powder product.

3) Description of range of ingredients:

All weight % of materials are optimized for this system. Like products may substitute for the quoted ingredients. Percentage of materials will produce different materials with different physicals. Different pigments may require different loadings.

Acid-modified Ethylene Terpolymer with Temperature Stable Ester and High Acidic Functionality (Dupont Bynel CXA 2022+Like Products)

This material is found to maximize different polymer compatibility in the system. This material also aids in adhesion of the blended formulation and filler compatibility. Properties such as impact resistance and cold weather impact are improved with utilization of the material. Other thermoplastic olefins, functionalized or non-functionalized, co, ter polymers, other thermoplastic and non-thermoplastic resins may be added at a range of 10–90% to modify end physicals. In addition, other functionalized polymers, with either aromatic or aliphatic type backbones may be substituted. The functional groups may include: alkyd, hydroxy, carboxy, amine, and virtually any other compound containing an active hydrogen. Melt flow ranges are from 1 to 1000. Loadings may range from 5 to 95%, final formulation.

Polyethylene/Methacrylic Acid Copolymer (Dupont Nucrel, Dow Primacor+Like Products)

This material is used for adhesion, and filler compatibility. Chemical resistance is also realized with this resin. Loadings may range from 5 to 95%, final formulation. Other thermoplastic olefins, functionalized or non-functionalized, co, ter polymers, other thermoplastic and non-thermoplastic resins may be added at a range of 10–90% to modify end physicals. Melt flow ranges are from 1 to 1000. Loadings may range from 5 to 95%, final formulation.

Polyethylene/Methacrylic Acid Copolymer-ionomer (Dupont Surlyn, Exxon Lotek+Like Products)

This resin adds hardness, tensile, and mar resistance to the formulation. Other thermoplastic olefins, functionalized or non-functionalized, co, ter polymers, other thermoplastic and non-thermoplastic resins may be added at a range of 10–90% to modify end physicals. Melt flow ranges are from 1 to 1000. Loadings may range from 5 to 95%, final formulation.

Pigment Polymeric Dispersion (MA Hanna Product #10080332 Grey+Other Sources and Types of Pigment— i.e., Powder, Encapsulated Spheres, Paste, etc)

The pigment supplies the color to the system. The particular pigment that we use is "master batched" in linear-low density polyethylene. Typical pigment loadings are 0.001 to 50%, final formulation.

Antioxidant (Ciba Irgonox 1010+Others)

The anti-oxidant provides stability to the resin, during thermal processing and during the coating process. This material is used as an anti-oxidant to protect the cured resin from thermal decomposition, upon exposure to the flame applied topcoat. Higher loading levels show improvement in thermal stability, where lower levels decrease the thermal stability of the basecoat. Other "Non-phenol" type antioxidants are expected to give the same results. An example includes thioester amtioxidants. Loadings range from 0.01 to 5%, final formulation.

UV Stabilizer (Fairmount Chemical Co. Mixxim BB/100 Benzotriazole Light Stabilizer+Others)

The stabilizer provides stability to the coating, when exposed to sunlight and other UV sources. Other light stabilizers that may be incorporated include: benzophenone, benzotriazole, triazine, benzoxazinone, hindered amines, and hindered benzoate. Loadings may range from 0.001% to 5%, final formulation.

Surfactant (Estron Chemical, Inc. Resiflow LV-67+Others)

The acrylic is used to improve flow, eliminate air entrapment, orange peel, pinholes, craters, and other surface imperfections. This ingredient improves the flexibility of the coating and provides for better topcoat-basecoat adhesion. A range of 0.1 to 5%, final formulation is obtainable. Other acrylic (Solutia|Modaflow 2100—direct substitute) and non-acrylic modifiers are expected to yield the same results (i.e., benzoin and Acetylenic diol's). Ranges are from 0.1 to 5%, final formulation.

Amorphous Fumed Silica (Degussa-Hüls Corp. Aerosil 200)

When this material is added as a dry-post additive (to the finished powder), benefits of enhanced flow of the powder are realized. Other fillers, especially aluminum oxide may substitute. Loadings are from 0.0001 to 5%, final formulation.

This material, if incorporated into the formulation during the melt mixing portion of the manufacturing, is used as a thickening agent/anti-sag agent. Decreasing the loading of this material into the resin decreases the viscosity. Increasing the loading of this material (up to 10%) increases the viscosity. The addition of the silica does not significantly affect the performance, although gloss is matted with incorporation of silica. The material may be loaded at 0.001 to 10%, final formulation. Other thickening agents that may substitute include, but are not limited to the materials listed in the filler portion of this disclosure (i.e., aluminum oxide). Loadings are anticipated to be 0.1 to 25%, final formulation.

Fillers

Fillers common the industry (but not limited to) include: aluminum oxide, calcium carbonates, dolomite, calcium sulfate, silicates, glass spheres (solid and hollow), asbestos, talk, kaolin, mica, feldspar and nepheline syenite, wollastonite, silicate spheres, silica, natural silicas, synthetic silicas, adhesion promoters (silanes, titanate, zirconate, and aluminate coupling agents), molybdenum disulfide, polytetrafluoroethylene, barium sulfate, metals and metal oxides, aluminum hydroxide, carbon, fibers (natural and synthetic-basalt, carbon polyamide, glass, boron, ceramic), electrically conducting fillers (stainless steel, carbon, carbon fibers, silver coated glass particles), radar absorbing materials, radiation shielding/EMI shielding (Tungsten powder), magnetic additives (strontium ferrite and ceramics), rubber (virgin and re-processed), and sound dampening materials may be incorporated into the resin to dilute the cost, and/or alter physical properties. Loadings for fillers may range from 0.01 to 75%, final formulation. Typically increased loadings of fillers will cause the viscosity of the final formulation to increase.

Thermal Conductivity Agents

Zinc Oxide (and other materials such as ceramics), in addition to reinforcement, also provides resilience and heat conductivity. This is an important filler, where enhanced thermal conductivity is of concern. Loadings are typically at 0.1 to 75%, final formulation.

Anti-thermal conductive materials (glass and ceramic) may also be used for the opposite effect. Loadings are at 0.1 to 75%, final formulation.

Flame Retardants

Flame retardants for the formulation are plentiful. Some of these include: halogen liberating flame retardants, antimony oxide, phosphorous containing agents, modified silicones, alumina trihydrate, magnesium hydroxide, organically modified montmorillonite clay, expandable graphite, boric oxide, zinc borate, etc. Loadings are typically 0.1 to 60%, final weight.

Corrosion Inhibiters

Corrosion protection agents may include polyaniline, amino tri (methylene-phosphonic acid)—(ATMP), ammonium benzoate, sodium nitrite, 2-benzothiazolylthiosuccinic acid (MBTS), primary, secondary, and tertiary aliphatic amines, aliphatic diamines, cycloaliphatic and aromatic amines, polymethylimines, long-chain ethanolamines, imidazolines, amine salts of carbonic, carbamic, acetic, benzoic, oleic, nitrous, and chromic acids, acetylenic alcohols, lauric alcohol, alkyl chromates, organic esters of nitrous acid, organic esters of phthalic acid, organic esters of carbonic acid, nitronaphthalene, nitrobenzene, etc. The anticipated loadings may range from 0.1 to 50%, final formulation.

Antistatic Agents

Antistatic agents prevent dust attraction, discharge process that may damage the product (i.e., packaging and handling of electronic chips), and curbing spark discharge that can produce serious accidents. Additives with loadings are at 0.1 to 50%, final formulation include. Cationic compounds (best effect in polar substrates), generally consisting of a voluminous cation which often contains a long alkyl residue (i.e., quaternary ammonium, phosphonium or sulfonium salt, etc.). In most cases, the anion is the chloride, methosulfate or nitrate originating from the quaternization process. Anionic compounds, mostly an alkyl sulfonate, sulfate or phosphate, a dithiocarbamate or carboxylate, alkyli metals, etc. Nonionic compounds, uncharged surface-active molecules including: polyethylene glycol esters or ethers, fatty acid esters or ethanolamides, mono- or diglycerides or ethoxylated fatty amines, etc.

Biostabilizers

These materials are often used as mold inhibitor (fungicide), and tannin stain blocking agent. Several commercially available agents are available, which typically base their chemistry on organic materials (i.e., Buckman Laboratories). Other materials may include zinc oxide, copper oxides, etc. The anticipated loadings are 0.1 to 10%, final formulation.

Chemical Blowing Agents

Chemical blowing agents, when incorporated into the basecoat, release small amounts of gas—resulting in a foamed material. Examples include a mixture of sodium bicarbonate and acetic acid, etc. This material is typically incorporated at 0.1 to 10%, final formulation.

Scent Additives

Scent additives (such as Stanley S. Schoenmann's products) provide an array of different fragrances that may be incorporated into the formulation. Loadings are 0.1 to 25%, final formulation.

Bittering Agents and Pepper

Bitter agents such as ground buffalo gourd may be incorporated into the coating to prevent damage by livestock (via oral degradation of the coating). Other ingredients include cyanine pepper powder, etc. Loadings are typically 0.1 to 25%, final formulation.

Pigments/Effects

Carbon black will cause tensile, modulus, tear, and hardness to increase, as the carbon loading is increased. In addition, carbon black gives the formulation the color of black. Typical loadings range from 0.1 to 40%, final formulation. Many other organic and inorganic pigments may be used. Specialty pigments, such as pearl and glow-in-dark may be incorporated.

Fluorescent Whiting Agents

Materials such as 2,2'-(2,5-thiophenediyl)bis[5-tert-butylbenzoxazole] are often used to provide brighter looking colors. Typical loadings are 0.1 to 10%, final formulation.

Lubricants

Incorporation of lubricants may provide useful properties to the system. Typical lubricants include: fatty alcohols ant their dicarboxylic acid esters, fatty acid esters of glycerol and other short chain alcohols, fatty acids, fatty acid amides, metallic soaps, oligomeric fatty acid esters (fatty acid complex esters), fatty acid esters of long-chain alcohols, montanic acid, esters and soaps, polar polyethylene waxes and their derivatives, nonpolar polyolefin waxes, natural and synthetic paraffin waxes, fluoropolymers, and molybdenum disulfide.

Plasticizers

Typical plasticizers that may be used include phthalates, monocarboxylic acid esters, acetates, propionates and butyrates, esters of ethylbutyric and ethylhexanoic acid, glycolic acid esters, benzoic acid esters, epoxidized fatty acid esters, plasticizers based on phthalic acids, aliphatic dicarboxylic acid esters, phosphates, polyester plasticizers, trimellitic acid esters, citric acid esters, sulfonic acid esters and sulfamides, alcohols, ethers and ketones, abietic acid esters, polymerizable plasticizers, hydrocarbons and halogenated hydrocarbons. Ranges are from 0.1 to 25%, final weight.

Other Resins/Blends That May Substitute Main Resin Components

Several other resins and blends thereof, may substitute for the main resin components quoted above. Examples are shown below in section J.

Manufacture—Primer

1) Disclosure of preferred alcohol/silane formula (based on volume % of final formulation):

| | |
|---|---|
| 92% | Denatured ethyl alcohol (VWR Brand VW0475-7) |
| 5% | De-ionized water |
| 3% | Silane mixture (85% methanol, 4% organic phosphonium chloride salt, and 10% silane monomer) |

Other functional silanes that may substitute include (but not limited to): alkyd, hydroxy, carboxy, amine, isocyanate functionality and virtually any other compound containing an active hydrogen. Also, ionic and anionic silane salts may substitute. Blends of any above may also work.

All ingredients are blended at room temperature. The mixture is allowed to stand for 15 minutes and then is ready for use.

Chemistries of Alternative Thermoplastic Powder Topcoats

Alternative resins and blends thereof include (but not limited to) these plausible thermoplastic resin systems: ethylene-vinyl acetate, polypropylene, ethylene-methyl acrylate EMA and ethylene-methyl methacrylate EMAA/polyethylene copolymers, polyethylene, polyethylene acid terpolymers, polyethylene ionomers, polyamide co- and ter-polymers, thermoplastic elastomers (TPE's), acrylonitrile-butadiene-styrene, acrylonitrile halogenated polyethylene, acrylonitrile halogenated styrene, acrylic-styrene-acryonitrile, cellulose acetate, cellulose acetate-butyrate, cellulose acetate-propionate, halogenated polyethylene, halogenated polyvinyl chloride, polymonochlorotrifluoroethylene, diallyl phthalate, ethyl cellulose, ethylene-chlorotrifluroethylene, ethylene-propylene, tetrafluoroethlyene-hexafluoropropylene-vinylidene fluoride ter-polymer, EVOH, PEBA, ethylene-tetraflurethylene, fluorinated ethylene-propylene, high-impact polystyrene, vinyl modified epoxy, liquid crystal polymer, methacrylate-butadiene-styrene, polyamide, polyamide-imide, polyacrylonitrile, polybutylene, polybutylene terephthalate, polycarbonate, polychlorotrifluoroethylene, polyphenylene ether copolymer, polyetherether ketone, polyphenylene ether homopolymer, polyetherimide, polyethylene oxide, polyethersulphone, phenly-formaldeahyde, perfluoroalkoxy, polyimide, polyisobutylene, polyisoethylene, paramethylstyrene, polymethylpentene, polyphenylene oxide, polyphenylene sulfide, polystyrene, polytetrafluoroethylene, polyurethane (polyester and polyether backbone), polyvinyl chloride, polyvinylidene fluoride, polyvinyl fluoride, styrene-acrylonitrile, styrene maleic anhydride, polytetra fluorethylene, urea-formaldehyde, vinyl acetate-ethylene, polyacetal, polyacrylic, polyalkyd, polyallylic esters or allyis, cellulosic esters, halogenated polyalkylene ether, cyanate/cyanamide polymers, halogenated epoxies, cycloaliphatic epoxys, epoxyimide polymers, polyester polymers, polyether polymers, and polyphenylene.

In addition, modifications to the above listed material, including silane grafting, maleic anhydride grafting, acrylic acid grafting, and grafting of any functional group containing an active hydrogen may be used. For example, polyethylene may be modified (peroxide grafting) to include silane, maleic anhydride, acrylic acid, or virtually any functional group containing an active hydrogen.

Also, co- and poly-polymers utilizing the above resins and/or modified resins may be used.

Furthermore, any virtual array of blends utilizing the aforementioned thermoplastic resins, modified resins, or co- and poly-polymers of above listed resins may be used.

Most coatings are acceptable for flame spray/arc-spray/ other thermal spray techniques.

What is claimed is:
1. A coating system comprising:
   a) basecoat of an thermosetting asphalt extended, chemically cross linked-urethane/epoxy hybrid basecoat resting on a substrate that off-gases when coated with a thermoplastic material; and
   b) a thermoplastic powder coating topcoat overlying at least the base coat;
   c) wherein the thermosetting asphalt extended, chemically cross linked-urethane/epoxy hybrid basecoat comprises, in weight percent based on final formulation:
      between 10 and 90% of a petroleum asphalt;
      between 10 and 90% of a hydroxy-terminated homopolymer;
      between 0.1 and 30% of an epoxy-functional reactive diluent for reducing the viscosity of the composition;
      up to 5% of a surfactant for improving surface imperfections;
      up to 5% of an anti-oxidant; and
      up to 25% of a thickening agent for improved thermal resistance, resiliency, adhesion to the substrate and topcoat, and chemical resistance.

2. The coating system of claim 1, wherein the thermosetting basecoat composition further includes, based on weight percentage, one or more of a catalyst in a range between 0.0001 and 5%, polyols for higher strength, fillers for viscosity adjustment in a range between 0.1 and 75%, functional silanes in a range between 0.001 and 10%, thermal conductivity agents in a range between 0.1 and 75% of the formulation, hollow and/or solid glass filler spheres in a range of between 0.001 and 5%, drying agents ranging up to 20 gram/gram of water present, flame retardants in amounts ranging between 0.1 and 60%, corrosion inhibitors ranging between 0.1 and 50%, antistatic agents ranging between 0.1 and 50%, biostabilizers ranging between 0.1 and 10%, chemical blowing agents ranging between 0.1 and 10%, scent additives ranging between 0.1 and 25%, bittering agents ranging between 0.1 and 25%, pigments ranging between 0.1 and 40%, fluorescent whiting agents ranging between 0.1 and 10%, lubricants ranging between 0.1 and 25%, UV stabilizers ranging between 0.001% and 50%, powdered (−20 to −1250 mesh size) thermoplastic materials and between 0.001% and 50% of powdered thermoplastic materials with incorporation of one or more of the following: fillers, thermal conductivity agents, flame retardants, corrosion inhibiters, antistatic agents, biostabilizers, chemical blowing agents, scent additives, bittering agents and pepper, pigments/effects, fluorescent whiting agents, lubricants, and plasticizers (−20 to −1250 mesh size).

3. The coating system of claim 1, wherein the petroleum asphalt ranges between 20 and 70%, the hydroxy-terminated homopolymer ranges between 20 and 70%, and the epoxy-functional reactive diluent ranges between 3 and 25%.

4. The coating system of claim 1, wherein the surfactant, the anti-oxidant, and the thickening agent of the basecoat thermosetting composition range between 0.2 and 3%, 0.2 and 3%, and 0.1 and 10%, respectively.

5. The coating system of claim 1, wherein the substrate is one of wood or concrete.

6. The coating system of claim 1, wherein the hydroxy-terminated polymer is a hydroxy-terminated butadiene polymer.

7. The system of claim 1, wherein an alcohol-silane primer is on the substrate and surrounds at least a portion of the basecoat while leaving a portion of the substrate exposed, the topcoat overlying both the primer and the portion of exposed substrate.

8. The coating system of claim 7, wherein the alcohol primer consisting essentially, in weight percent, of between zero and up to 10% of a silane, a solvent ranging between 80 and 95%, and the balance water.

9. The coating system of claim 8, wherein the silane is one of: an ionic and anionic silane; a methanol, organic phosphonium chloride salt and silane monomer; or any other silane having an active hydrogen.

10. A coating system comprising:
   a) basecoat of an thermosetting asphalt extended, chemically cross linked-urethane/epoxy hybrid basecoat resting on a substrate that off-gases when coated with a thermoplastic material; and
   b) a thermoplastic powder coating topcoat overlying at least the base coat;
   wherein the thermoplastic powder coating topcoat has a topcoat thermoplastic composition comprising, in weight percent, based on final formulation:
      between 10 and 90% of a modified ethylene terpolymer;
      between 5 and 95% of a polyethylene/methacrylic acid copolymer;

between 5 and 95% of a polyethylene/methacrylic acid copolymer ionomer;
up to 50% of a coloring pigment;
up to 5% of an anti-oxidant;
up to 5% of an ultraviolet stabilizer;
up to 5% of a surfactant for improving surface imperfections; and
up to 25% of a thickening agent.

11. The coating system of claim 10, wherein the topcoat thermoplastic composition is modified, based on weight percent, with the incorporation of one or more of other fillers for viscosity adjustment ranging between 0.1 and 75%, thermal conductivity agents ranging between 0.1 and 75% of the formulation, drying agents ranging up to 20 gram/gram of water present, flame retardants in amounts ranging between 0.1 and 60%, corrosion inhibitors ranging between 0.1 and 50%, antistatic agents ranging between 0.1 and 50%, biostabilizers ranging between 0.1 and 10%, chemical blowing agents ranging between 0.1 and 10%, scent additives ranging between 0.1 and 25%, bittering agents ranging between 0.1 and 25%, pigments ranging between 0.1 and 40%, fluorescent whiting agents ranging between 0.1 and 10%, and lubricants and plasticizers, each ranging between 0.1 and 25%.

12. The coating system of claim 10, wherein each of the modified terpolymer and the polyethylene/methacrylic acid copolymer ranges between 20 and 70%, and the polyethylene/methacrylic acid copolymer ionomer ranges between 5 and 70%.

13. The coating system of claim 10, wherein the surfactant and the thickening agent of the topcoat thermoplastic composition range between 0.2 and 3% and 0.1 and 10%, respectively.

14. The coating system of claim 10, wherein the substrate is one of wood or concrete.

* * * * *